C. D. LEONARD AND H. J. HAUSER.
WHEELING COOP.
APPLICATION FILED DEC. 19, 1919.
1,397,693.
Patented Nov. 22, 1921.
5 SHEETS—SHEET 1.
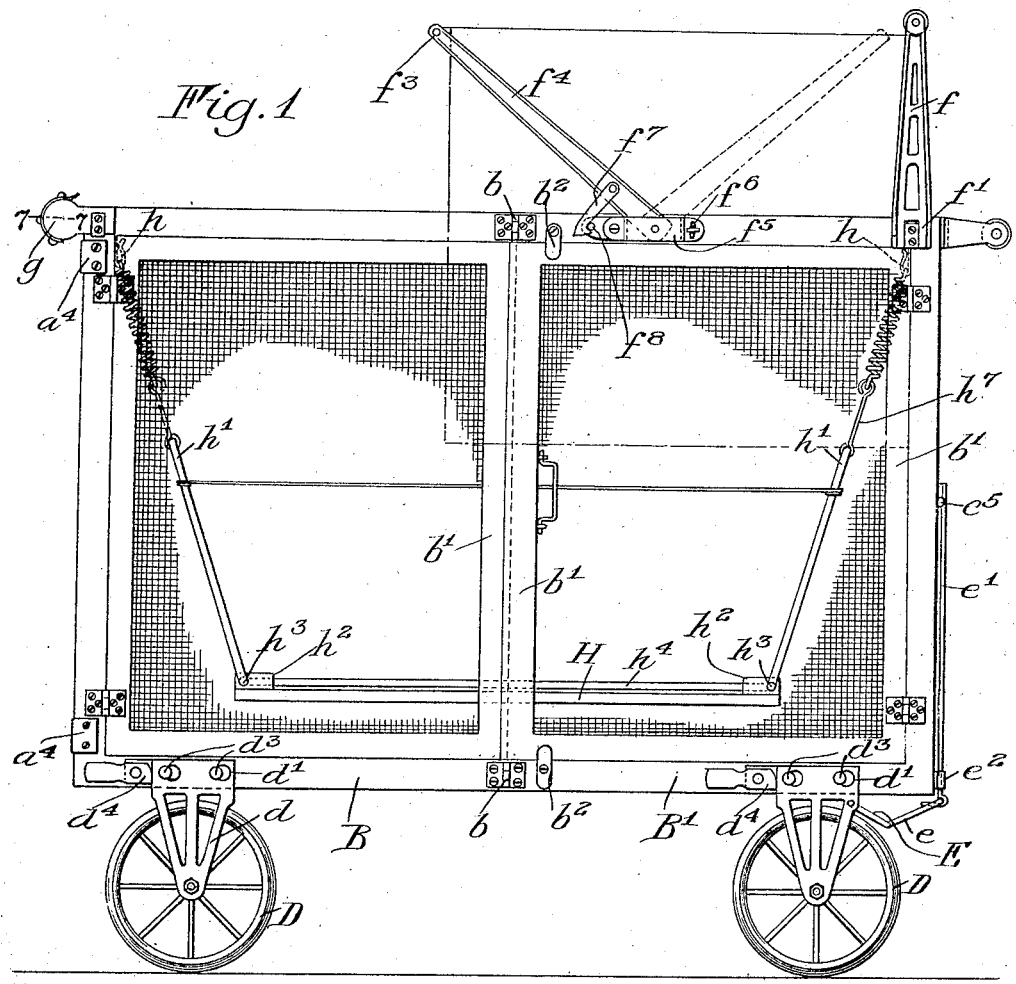
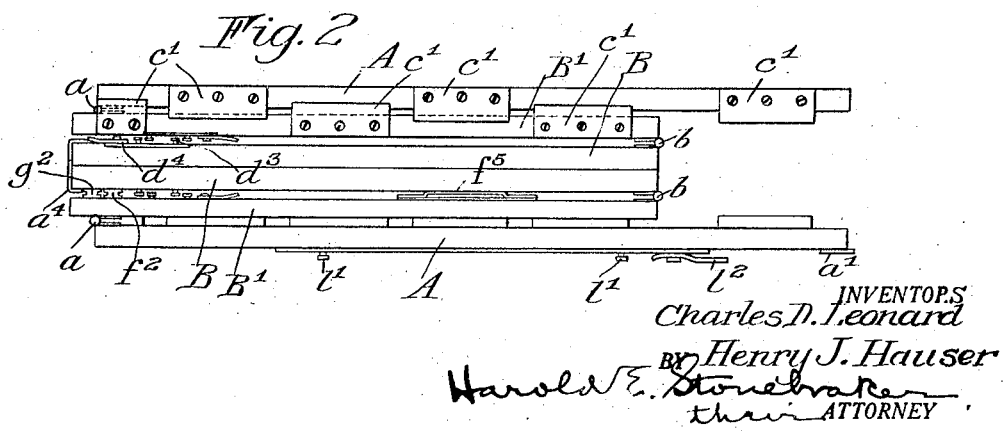
INVENTORS
Charles D. Leonard
Henry J. Hauser
BY Harold E. Stonebraker
their ATTORNEY C. D. LEONARD AND H. J. HAUSER.
WHEELING COOP.
APPLICATION FILED DEC. 19, 1919.
1,397,693.
Patented Nov. 22, 1921.
5 SHEETS—SHEET 2.
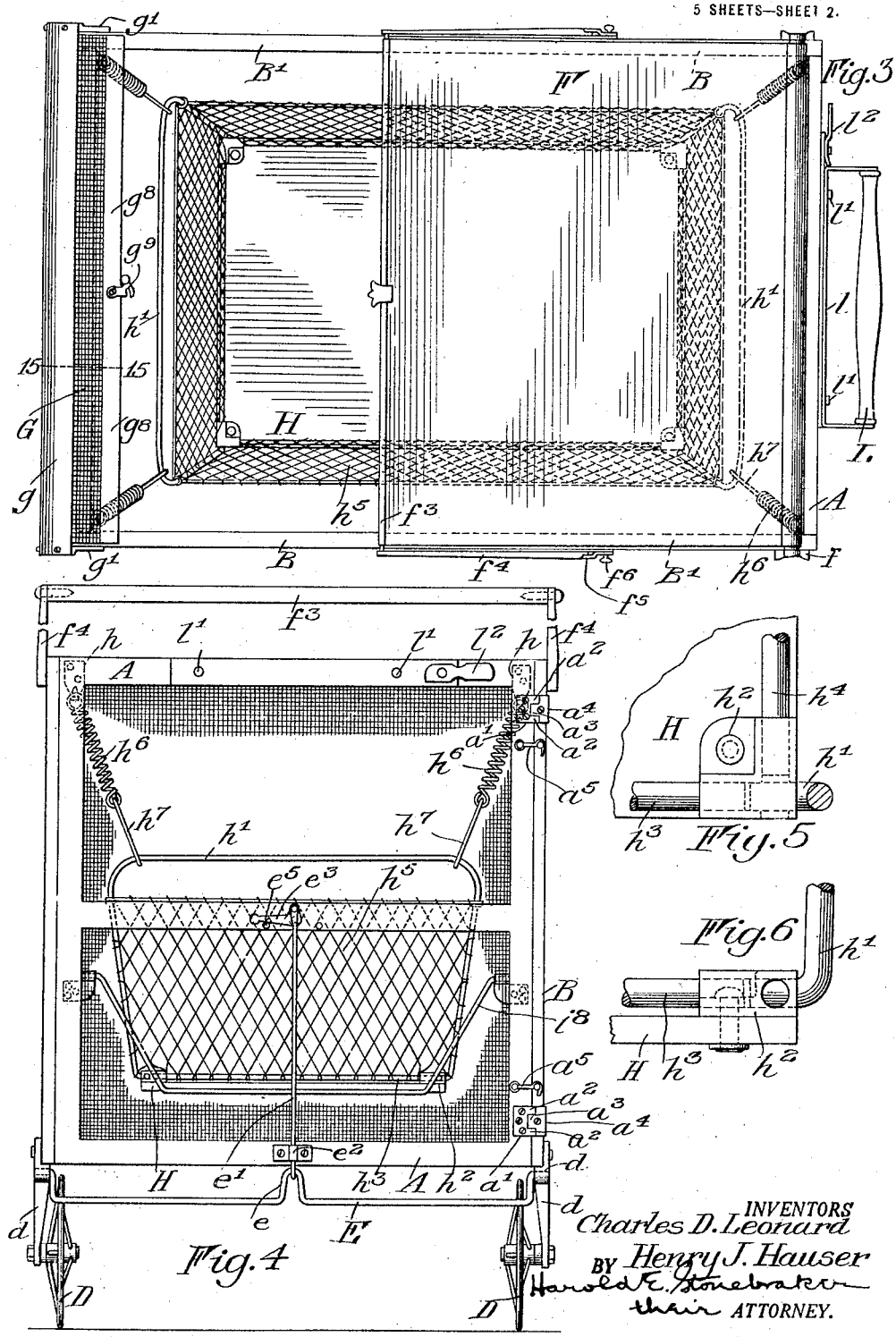

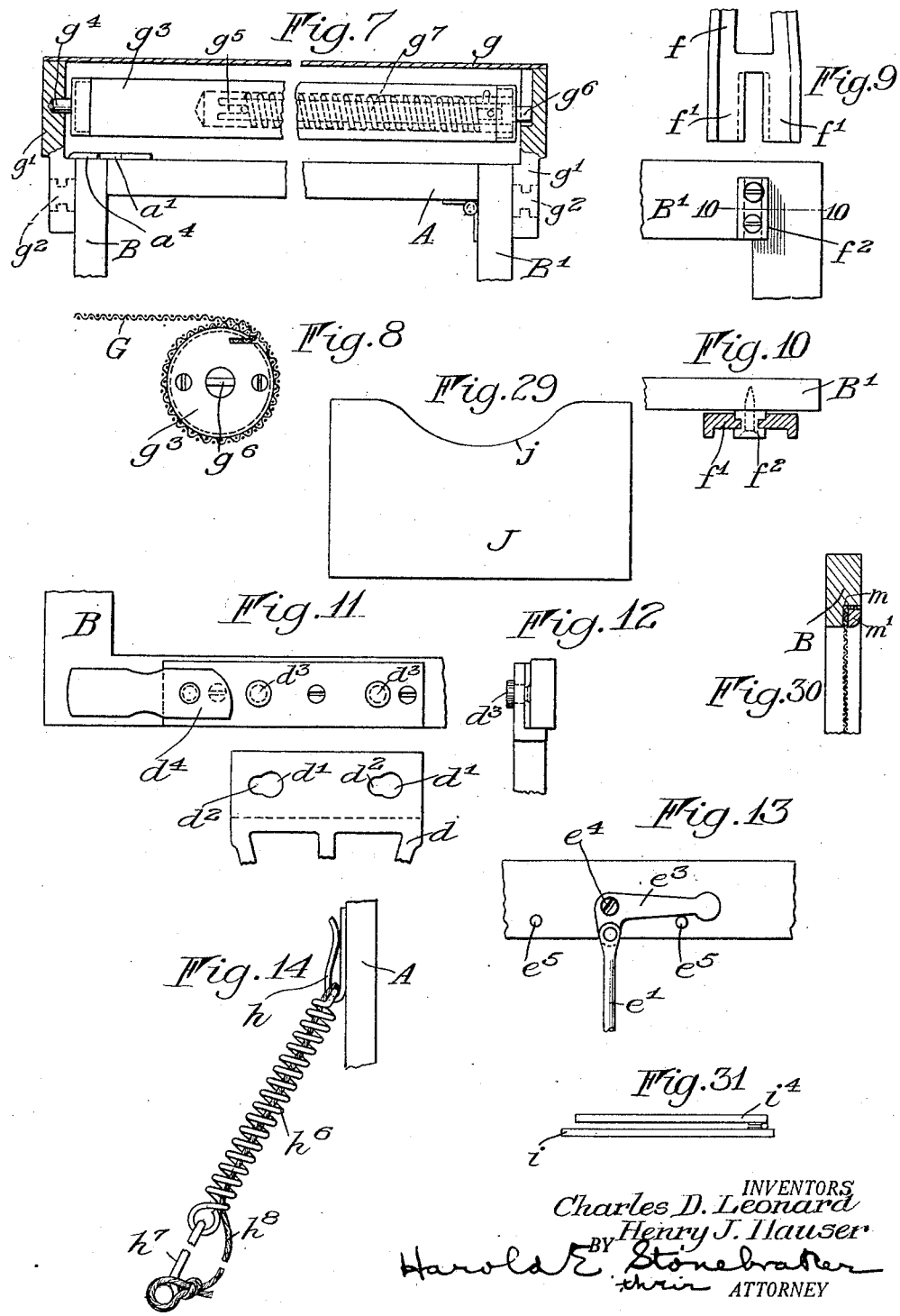

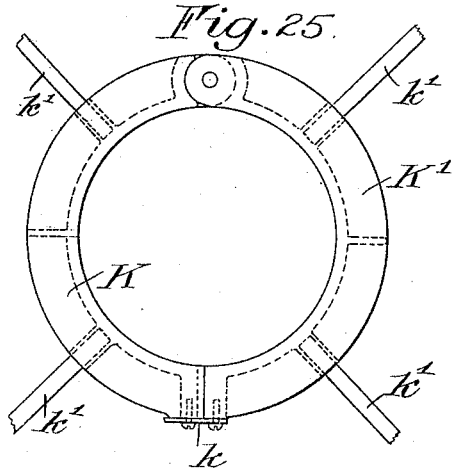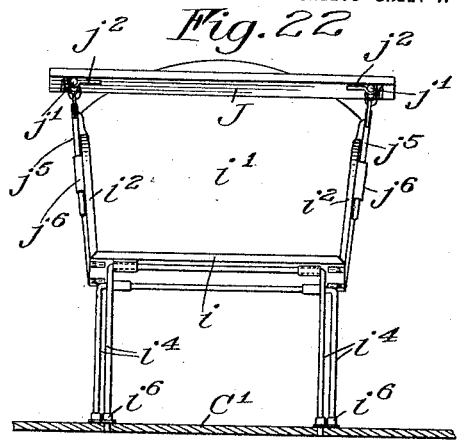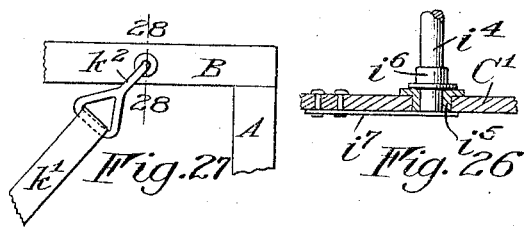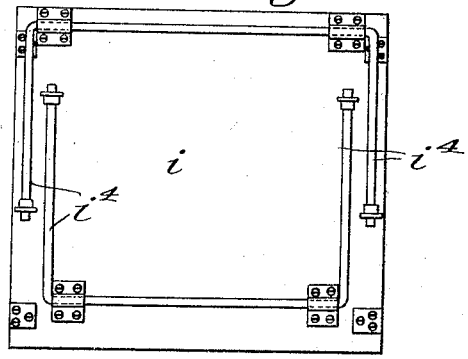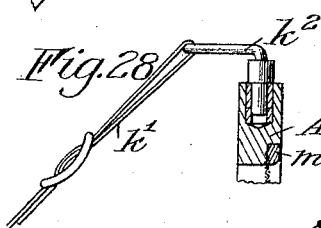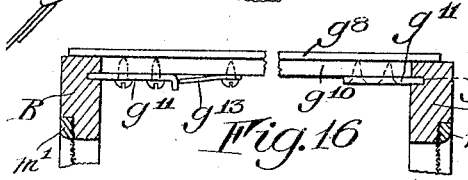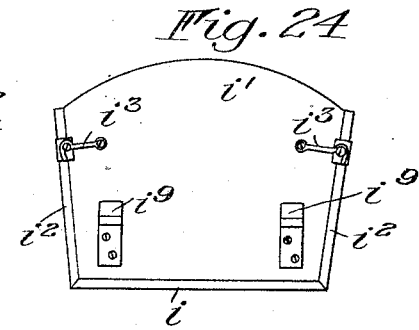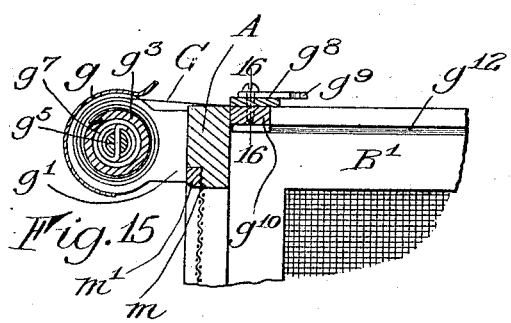

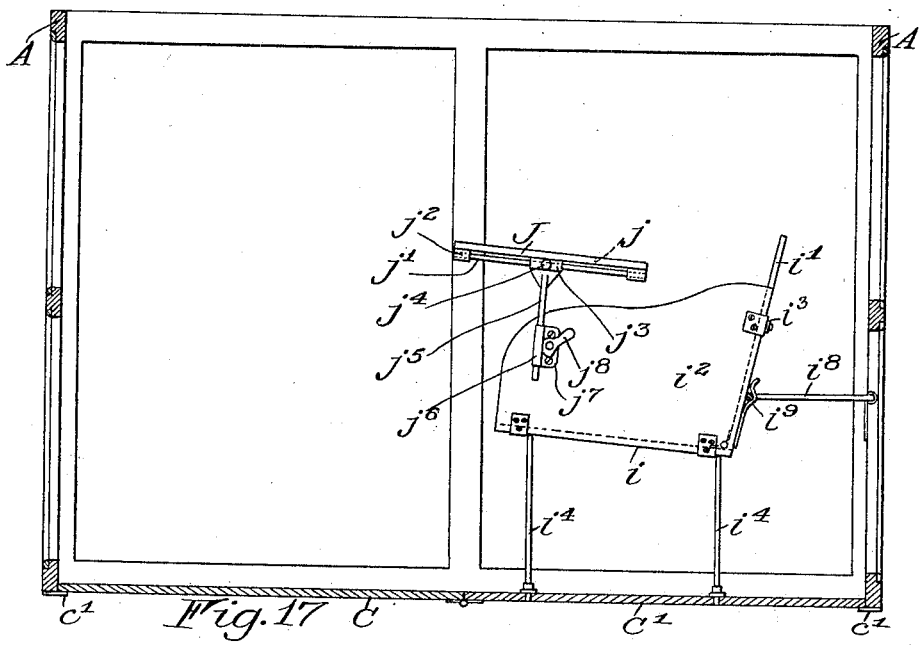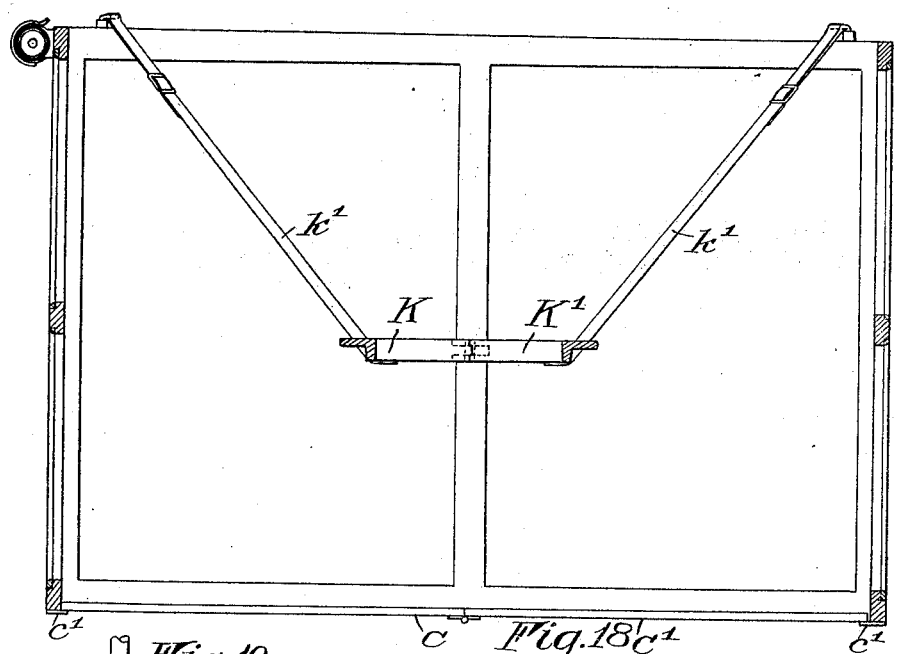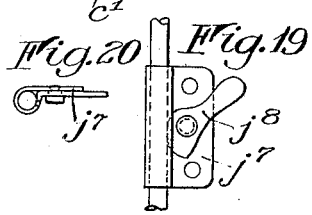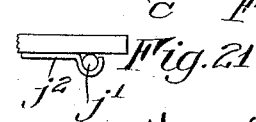

UNITED STATES PATENT OFFICE.

CHARLES D. LEONARD AND HENRY J. HAUSER, OF ROCHESTER, NEW YORK.

WHEELING-COOP.

1,397,693.  Specification of Letters Patent.  Patented Nov. 22, 1921.

Application filed December 19, 1919. Serial No. 346,083.

*To all whom it may concern:*

Be it known that we, CHARLES D. LEONARD and HENRY J. HAUSER, both citizens of the United States of America, residing at Rochester, in the county of Monroe and State of New York, have invented certain new and useful Improvements in Wheeling-Coops, of which the following is a specification.

The invention relates to a wheeling coop, or structures of the class which are sometimes commercially called "kiddy coops," and it has for its purpose to provide a structure which is completely collapsible, and can be packed compactly when collapsed, so that the entire structure may be readily carried from one place to another, and quickly set up.

Another object of the invention is to afford a structure which will conveniently and safely accommodate a child under different conditions, whether he be playing, standing, sitting, or sleeping.

A further purpose of the invention is to make provision for protecting a child adequately, while in the coop, from excessive light, wind, or mosquitos and similar insects.

Another purpose of the invention is to provide a convertible and readily adjustable bed, positionable within the coop to receive a baby while sleeping.

A further object is to provide the device with simple attachments that will permit a child to occupy a sitting position in a chair within the coop, or to occupy a standing position for playing or exercising, while at the same time prevent the child from falling or otherwise becoming hurt.

An additional purpose of the invention is to construct the frame of foldable or collapsible sections, coöperating so as to insure an accurate and tight fit of all the parts when assembled, and to preclude the sections being accidentally separated, warping, or otherwise interfering with the proper operation of the structure.

The invention consists of a number of other novel and advantageous features, in addition to those referred to above, all of which will appear from the following detailed description, considered in conjunction with the accompanying drawings, while the novel features are pointed out in the claims at the end of the specification.

In the drawings:

Figure 1 is a side elevation showing a practical embodiment of the invention, in its preferred form, this view illustrating the hammock bed suspended within the coop, and the light shade in open position;

Fig. 2 is a plan view showing the position of the frame sections when collapsed, and also the general arrangement of the parts as packed between the sections of the frame;

Fig. 3 is a plan view of the parts illustrated in Fig. 1;

Fig. 4 is an end elevation;

Fig. 5 is a detail view in plan showing one of the corners of the hammock bed;

Fig. 6 is a side elevation of the parts appearing in Fig. 5;

Fig. 7 is a sectional view in partial elevation on line 7—7 of Fig. 1;

Fig. 8 is an end elevation of the spring roller and fabric;

Fig. 9 is a side elevation illustrating the detachable connecting means between one of the uprights which supports the light shade on the frame, the coöperating portion of the upright appearing removed, above the frame;

Fig. 10 is a sectional view on line 10—10 of Fig. 9, showing the parts in engagement with each other;

Fig. 11 is an enlarged side view of a portion of one of the wheel brackets and the part of the frame on which it is mounted, the bracket appearing removed below the frame;

Fig. 12 is an end view of the same, showing the wheel bracket located on the frame;

Fig. 13 is an enlarged view of the operating lever which controls the bracket;

Fig. 14 is an enlarged view illustrating one of the yieldable connections between the frame and the hammock bed;

Fig. 15 is a sectional view on line 15—15 of Fig. 3;

Fig. 16 is a sectional view on line 16—16 of Fig. 15;

Fig. 17 is a side elevation of the coop, with parts omitted, showing the detachable chair positioned therein;

Fig. 18 is a side view illustrating the child's supporting ring suspended within the coop, parts of the latter being omitted, for holding the child in a standing position;

Fig. 19 is a detail view of the locking means for adjusting the height of the chair table;

Fig. 20 is an end view of Fig. 19;

Fig. 21 is a fragmentary view of the chair table, looking at one edge thereof;

Fig. 22 is a front view of the detachable chair positioned on the floor of the coop;

Fig. 23 is a bottom view of the chair with the supporting members folded thereunder;

Fig. 24 is a rear elevation of the chair with parts omitted.

Fig. 25 is a plan view of the supporting ring for holding the child in a standing position;

Fig. 26 is an enlarged sectional view illustrating one of the chair supporting members, and its relation to the floor when the chair is in position within the coop;

Fig. 27 is an enlarged plan view of one of the supporting members for the ring illustrated in Fig. 25, and showing its engagement with the frame;

Fig. 28 is a sectional view on line 28—28 of Fig. 27.

Fig. 29 is a fragmentary view of the chair table in plan;

Fig. 30 is a fragmentary sectional view of the wall of one of the foldable side sections, and Fig. 31 is a detail view in elevation of a portion of the chair when folded, with parts omitted.

The embodiment here illustrated is intended to show merely one practical adaptation of each feature of the improvements, and the invention is not to be confined to the precise form or arrangement that will now be described.

Referring in detail to the drawings, the structure comprises a frame, consisting of end sections A, each end section having pivotally connected thereto one side section. Each side section comprises two portions B, B', which are hinged together and foldable one upon the other, while both portions of the side section, when folded, are in turn foldable upon an end section, when it is desired to collapse the device for carrying it from one place to another. The sections are shown in their collapsed arrangement in Fig. 2 $a$ designating the hinged connections between the end sections A and the side sections, and $b$ designating the hinged connections between the two portions of each side section.

When the parts are folded, each end and side sections constitute a unit, separable from the other end and side sections, but the parts are adapted to be disposed as in Fig. 2, in order to afford storage space at one end, adjacent to the side sections and between the end sections. This compartment is provided by making the end sections of greater width than the individual portions of the side sections, and the space thus afforded is sufficient to house the wheels and wheel brackets and other parts, if desired.

The end sections comprise walls of screening material, preferably metal, and the portions of the side sections contain hinged panels of similar screening material. These panels are designated at $b'$, one overlapping the other at the center, and the overlapping panel being held in position within the side section by means of pivoted retaining lugs $b^2$. The purpose of the swinging panels is to permit of opening the coop at one side, making easy access thereto.

When the parts are assembled, as in Figs. 1 and 4, it will be observed that each end section A is pivoted or hinged at one side to the adjacent side section and is detachably connected at the other side to the adjacent side section. This detachable connection should be such as to present any relative movement of the connected section either vertically, or transversely. This is accomplished by providing the end section with a retaining plate $a'$ having lugs or extensions $a^2$ which overlie the edge of the side section, see Fig. 4. The extensions $a^2$ afford therebetween a recess or pocket which receives a tongue $a^3$ that overlies the end section, and is part of the retaining plate $a^4$ carried by the side section. A hook $a^5$, attached to one of the sections and adapted to engage a pin on the other section, holds the parts together, and the retaining plates, just described, afford means for holding the sections rigidly in their proper relationship, so that the entire frame, when set up, is firm and tight.

The floor preferably consists of two sections C, C', see Fig. 18, which are foldable together, and which when in use, are supported on flanges $c'$, see Figs. 2 and 18, said flanges being carried by the respective side and end sections and attached at the lower edges thereof. The flanges $c'$ are so arranged that when the frame is folded, they will occupy alternate positions, as in Fig. 2, to permit complete collapsibility.

The structure is supported on wheels D, each of which is carried by a bracket $d$ that is detachably supported on the frame. To this end, each wheel bracket $d$ is provided with openings having enlarged portionts $d'$ and reduced portions $d^2$, see Fig. 11. The enlarged portions $d'$ of the openings are adapted to drop over heads $d^3$ of locking pins carried by the frame, and then by sliding the bracket longitudinally, the reduced portions $d^2$ of the openings are brought under the head $d^3$, so that the bracket cannot be removed except by again sliding it longitudinally of the frame. This movement is prevented by a pivoted locking cam $d^4$, mounted on the frame and arranged to engage the bracket and hold it in proper position, as illustrated in Figs. 1 and 11.

In order to hold the coop in any one position and prevent movement of the wheels, conveniently operated braking mechanism is provided, which comprises a brake rod E having bent ends which are pivotally mounted in opposite wheel brackets $d$, see Fig. 4, whereby the brake rod E can swing about such pivotal axis into and out of engagement with the wheels D, see Figs. 1 and 4. In order to operate the brake rod, it is provided at its central portion with a U-shaped part $e$, to which is connected a vertical operating rod $e'$, slidable in a guide $e^2$ on the frame. The vertical rod $e'$ is connected at its upper end to a pivoted actuating lever $e^3$, see Figs. 4 and 13, and the latter is pivoted on the frame at $e^4$ and is movable to the two positions determined by the stops $e^5$, in order to hold the brake rod either applied to the wheels or released therefrom.

It is desirable to protect a baby while in the coop from sunlight, or excessive light, or wind in some cases, and to this end there is employed a light shade F, which is in the form of a spring-actuated curtain mounted upon uprights or vertical brackets $f$ positioned at opposite sides of the frame. Each bracket $f$ is removable and held in place frictionally by means of a bifurcated portion $f'$ formed on the upright or bracket and engaging guideways in a block $f^2$ attached to the frame. The free end of the shade F is connected to a horizontal rod $f^3$, see Figs. 1 and 3, forming part of a carrier which is adapted to swing from the position shown in dotted lines in Fig. 1 to that shown in full lines, in order to open or close the shade. In addition to the rod $f^3$, the carrier comprises pivoted arms $f^4$, each of which is pivoted in a swinging or adjustable plate $f^5$, which appears in normal position in Fig. 1. To remove the carrier from the frame, a locking nut $f^6$ is turned until it coincides with a corresponding opening in the plate $f^5$, which latter can then be sprung away from the frame sufficiently to permit removal of the arms $f^4$. $f^7$ is a catch pivoted on the arm $f^4$ and adapted to engage a pin $f^8$ on the frame in order to hold the carrier in its outermost position, with the shade open, as in Fig. 1. To close the shade, catch $f^7$ is thrown out of engagement with the pin $f^8$, and the shade and carrier are then automatically retracted by a spring such as found in any spring-actuated curtain. In order to protect a child from draft or wind, the shade is preferably provided with side shields adapted to drop down against the sides of the coop, as shown in dotted line in Fig. 1, and to be folded over the shade and rolled up when not in use.

It is further desirable to protect a child while in the coop from mosquitos, flies or other insects, and to accomplish this there is provided a fabric net adapted to be drawn over the top of the coop. The net referred to is designated by G, see Fig. 15, and is supported for spring-actuation within a housing $g$, see Figs. 1 and 15. The housing $g$ is mounted on brackets $g'$, see Fig. 7, which are slidable upon and held frictionally upon guides $g^2$ attached to the frame. The net G is secured to a spring roller $g^3$, which carries at one end a pintle $g^4$ journaled in the arm $g'$. The roller $g^3$ receives a spindle which is slotted at $g^5$, its opposite end being retained against rotation by means of a squared projecting portion $g^6$ engaging a corresponding slot in the adjacent bracket $g'$. The controlling spring $g^7$ has one end engaging the slot $g^5$ in the spindle, and its other end connected to the roller $g^3$ upon which the net G is wound. The net is provided at its free end with a rigid strip $g^8$ extending thereacross, see Figs. 3 and 15, and $g^9$ is a hook pivoted on the strip $g^8$ and adapted to engage a pin or projection at the opposite end of the frame, and hold the net in open position against the action of the spring $g^7$.

In order to center the net G and insure both edges moving evenly, guiding means is provided consisting of a strip $g^{10}$ secured under the strip $g^8$, and extending to a point adjacent the side sections of the frame, as shown in Fig. 16. The strip $g^{10}$ is provided with flanges $g^{11}$ projecting beyond the same and engaging in grooves $g^{12}$ in the adjacent walls of the side frame. Preferably, one of the flanges $g^{11}$ is slidable on the strip $g^{10}$ and held in its guiding position by means of a pivoted catch $g^{13}$, see Fig. 16, so as to permit removal of the flanges from engagement with the side sections, if desired. The strip $g^8$ engages the top of the side sections, see Fig. 16, and the flanges $g^{11}$, engaging in their coöperating grooves, hold the strip $g^8$ against the side sections and cause the net to move evenly as it is drawn across the coop, or retracted into its housing.

In order to accommodate a child while sleeping or resting, there is provided a detachable hammock bed adapted to be suspended within the coop on the hooks $h$. The hammock bed comprises a bottom H which is preferably flat and formed of fiber board or veneer, and carries end frames $h'$, preferably formed of wire and having their ends journaled in sockets of the corner fittings $h^2$ which are attached to the bottom, and appear in Figs. 5 and 6. Also arranged in sockets in said fittings $h^2$ are the transverse rods $h^3$ and longitudinal rods $h^4$. The rods $h^3$ and $h^4$ and frames $h'$ serve to support the hammock net $h^5$, as shown in Figs. 3 and 4, one side wall of the net being preferably adapted to swing downwardly, to permit access to the bed from the side. The hammock bed is held in its position within the coop by means of yieldable devices connected at one end to the frames $h'$ and at the other end to the hooks $h$. Each retaining device consists of a spring $h^6$, and a rod $h^7$ arranged between the spring and the frame $h'$, and the retaining devices all converge toward the hammock bed, as shown in Figs. 3 and 4, thus acting to prevent excessive swinging movement of the bed and holding it more or less firmly while at the same time permitting sufficient resiliency for the child.

In some cases, it is desirable to have the child in a sitting position within the coop, and for this purpose there is provided a collapsible chair that can be quickly positioned on the floor of the coop and rigidly held in the desired position. Referring to Figs. 17, 22 to 24 and 26, the chair comprises a bottom portion $i$, a back $i'$ hinged thereto, and sides $i^2$ also hinged thereto, the back and sides being held in position by hooks $i^3$ on the back engaging projections on the side. Arranged on the bottom of the seat $i$ are foldable supporting members, embodying rods $i^4$ which are adapted to engage bushings $i^5$ secured in openings in the floor of the coop, as shown in Fig. 26. The rods $i^4$ are provided with collars $i^6$ which overlie the bushings $i^5$ and limit movement downwardly of the supporting members. $i^7$ are spring plates secured to the underside of the floor and overlying the bushings $i^5$ and the openings within them, in order to prevent access of dust and dirt through said openings. The chair is positioned on the floor by unfolding the supporting members, as in Fig. 22, and positioning them in the respective openings in the floor. The chair is retained in this position by a bracing member $i^8$, see Fig. 17, which is pivoted to the adjacent end section of the coop and is adapted to engage under the spring fingers $i^9$, which are fixed to the back of the chair.

The chair also is provided with a table J, which is curved at its inner edge, as designated by $j$, and is adjustable both vertically and horizontally, and thus acts to hold a child safely in the chair by being positioned properly against the front portion of its body. Secured to the underside of the table J is a bar $j'$ held thereon by retaining flanges $j^2$. The bar $j'$, which is duplicated at opposite sides of the table, is slidable in a keeper $j^3$ for horizontal adjustment, being held in adjusted position by means of a set screw $j^4$. The table is adjustable vertically by means of rods $j^5$ slidable in sleeves $j^6$, which are formed by the plate $j^7$ which is bent upon itself and secured to the side of the chair. $j^8$ designates a clamping cam pivoted upon the plate $j^7$ and operable to retain the table in any position of vertical adjustment. It will be understood that the vertical and horizontal table guiding and adjusting means are preferably duplicated at both sides of the chair, and for the purposes of this description, it has been necessary to describe only one.

For holding a child within the coop in a standing position, for the purpose of exercise or play, there is provided a child's supporting ring, preferably consisting of two semicircular sections pivoted together, as shown in Figs. 18 and 25, and designated by K, K'. The sections K, K' of the ring are attached around the child by a suitable hook or retaining device $k$ which serves to hold the sections K, K' together. The supporting ring is held in proper position within the coop, as shown in Fig. 18, by means of flexible supporting devices, preferably consisting of adjustable straps $k'$, connected at one end to the ring and at the other end to supporting members $k^2$, see Figs. 27 and 28. The supporting members $k^2$ include pins which engage sockets in the upper surfaces of the side sections of the frame. The ring K, K' may be adjusted to proper vertical position, depending upon the height of the child, and is then fitted and secured about the body of the child above its waist and under the arms, thus constituting a support and enabling the baby to stand and play for a considerable time without tiring too greatly.

L designates a detachable handle which is mounted on a plate $l$, the latter being arranged for engagement with locking pins $l'$, see Figs. 3 and 4, and held in position by a locking cam $l^2$. Referring to Fig. 14, in order to prevent undue strain or breaking of the springs $h^6$ when the hammock bed is subjected to excessive or sudden weight, a cord or wire reinforcing member $h^8$ extends through the spring $h^6$ and is connected between the hook $h$ and the frame $h'$, whereby to take the weight of the bed and relieve the spring $h^6$ when the latter is stretched beyond the predetermined point.

The screening wire or screening material is preferably attached to the sections or panels by cutting away the section at one edge, see Fig. 15, as designated at $m$. The edge of the screening material is bent at right angles so as to engage the angular surface of the cutaway portion, and the screen is held in place by a securing strip $m'$ which engages both of the angular surfaces of the screen and holds them tightly against the frame. This affords an extremely firm and dependable connection for the screening wire and effectually prevents it from getting loose from the frame.

It is to be understood that while the above description sets forth various details, the invention is not in any sense limited to the precise mechanical form here disclosed, and the novel and important features may be successfully adapted to various other arrangements and modifications without departing from the purpose and underlying characteristics of the invention, as set forth in the following claims.

We claim:

1. In a wheeling coop, the combination with a support, of a wheel bracket detachably mounted thereon, a wheel carried by the bracket, and a movable cam acting to lock the bracket in position.

2. In a wheeling coop, the combination with a support, of a wheel bracket detachably mounted thereon, and having openings, each of which includes an enlarged and a reduced portion, pins carried by the support and engaging said openings in the bracket, a wheel carried by the bracket, and a pivoted cam which is movable to retain the reduced portions of said openings in engagement with the pins on the support.

3. In a wheeling coop, the combination with a support, of a wheel bracket detachably mounted on the support, locking pins carried by the support, the bracket being slidable with reference to said pins, a wheel carried by the bracket, and adjustable means for holding the bracket in locked relationship with said pins.

4. In a wheeling coop, the combination with a frame having locking pins, of a handle comprising a plate with openings adapted to lockingly engage said pins, and a cam adjustably mounted on the frame and arranged to engage said handle and retain it in locked position on said pins.

5. In a wheeling coop, the combination with end sections, of side sections pivoted thereto and foldable thereupon, said sections being so constructed that when collapsed with the side sections positioned adjacent to each other, a storage compartment is afforded between the end sections and at one end of the side sections.

In witness whereof, we have hereunto signed our names.

CHARLES D. LEONARD.
HENRY J. HAUSER.